W. TISCHBEIN.
AUTOMOBILE WHEEL.
APPLICATION FILED JULY 29, 1908.
956,611.
Patented May 3, 1910.
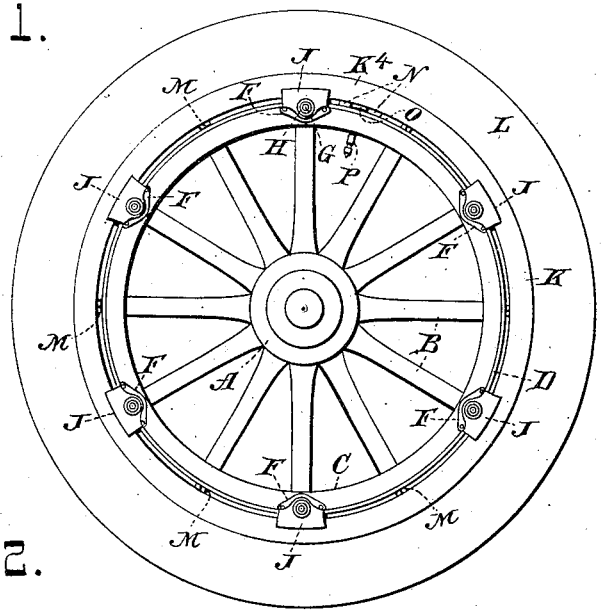
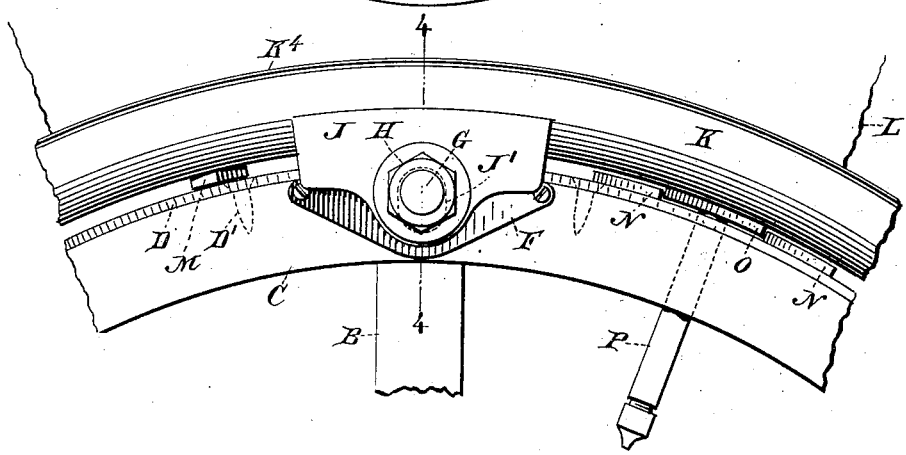
WITNESSES
INVENTOR
Willy Tischbein
BY
ATTORNEYS

UNITED STATES PATENT OFFICE.

WILLY TISCHBEIN, OF HANOVER, GERMANY.

AUTOMOBILE-WHEEL.

956,611.  Specification of Letters Patent.  Patented May 3, 1910.

Application filed July 29, 1908. Serial No. 446,017.

*To all whom it may concern:*

Be it known that I, WILLY TISCHBEIN, a subject of the German Emperor, and a resident of Hanover, Germany, have invented certain new and useful Improvements in Automobile-Wheels, of which the following is a specification.

My invention relates to automobile wheels and particularly to devices for permitting the usual pneumatic tire to be readily attached and removed from said wheel.

My invention will be fully described hereinafter and the features of novelty will be pointed out in the appended claims.

Reference is to be had to the accompanying drawings, in which—

Figure 1 is a face view of an automobile wheel with my invention applied thereto; and Fig. 2 is an enlarged detail face view thereof.

A represents the hub of the wheel to which the spokes B are secured in the customary manner. The outer ends of these spokes B are in turn fastened to the felly C to the outer periphery of which is secured the rim D, which is preferably made of some suitable metal as for instance steel. This rim extends across the outer periphery of the felly and is held in place by screws or other fastening devices D'.

K is an auxiliary rim having the usual straight portion and oppositely inclined portions and provided with hooks K⁴ between which the tire L is adapted to be secured. This auxiliary rim K is arranged to be slipped over the rim D until the one inclined portion thereof abuts against a correspondingly inclined flange forming part of the rim D. The opposite inclined portion of said rim K is engaged by wedge members J provided with apertures J' through which bolts G extend. These bolts G project through suitable openings in the felly C and may be held against removal from said openings by means of screws which pass through the heads of said bolts into the felly C. Nuts H are arranged to be screwed on the screw-threaded ends of said bolts into engagement with the wedge members J, thus serving to secure said wedge members in position against the outer inclined portion for maintaining the auxiliary rim K against removal from the rim D.

N designates spaced projections secured to or forming part of the rim D and O is a projection on the auxiliary rim K of a proper size to fit between the projections N.

P is the usual valve for inflating the tire. In the particular construction shown, the projection O is perforated for the passage of the valve P.

The projections N coöperating with the projection O prevent the tire L and the auxiliary rim K from creeping or otherwise moving circumferentially relatively to the main rim. In wheels of the kind to which applicant's device is particularly adapted, namely automobile wheels, it is usually necessary to use a device for securing the tire in position on the auxiliary rim which device usually has a portion such as a nut, projecting beyond the inner surface of the auxiliary rim. When the two rims are assembled, there is therefore an annular or circumferential space between the main rim and the auxiliary rim, so that the valve stem ordinarily would have an exposed portion in this space. In such constructions there is serious danger of dirt, grit, glass or other foreign substance working into this space and gradually injuring or cutting the valve at this point. Furthermore, should the portion of the wheel at which the valve stem is located be subjected to sudden successive shocks or jars, so that the auxiliary rim would be suddenly compressed toward the main rim at this point, the valve stem is likely to become pinched or mashed between the two rims. These defects and objections are overcome in my present construction by passing the valve stem through one of the projections which thus completely protects that portion of the said valve stem which otherwise would be exposed to the dangers above recited. These projections furthermore prevent any shock or jar from suddenly compressing the auxiliary rim toward the main rim as above mentioned. Said projections furthermore prevent the valve from being twisted off. With applicant's device, therefore, the valve which is the most vulnerable point of the pneumatic tire, is protected at a point where the danger of injury is greatest. The circumferential space between the rims in addition to accommodating the projecting portion of the tire securing device also prevents said rims from becoming irremovably connected by rust, dirt, etc., as might happen if no such space existed and the rims engaged each other through their entirety.

My invention thus provides a simple and effective securing means for tires and permits one tire to be easily and quickly substituted for another.

I claim:

1. A wheel provided with a main rim having an aperture, an auxiliary rim circumferentially spaced therefrom, means for detachably securing said auxiliary rim in position on the main rim, projections on one of said rims in the circumferential space between said rim located on either side of said aperture, a single projection on the other rim also in said circumferential space adapted to enter the space between said two projections to prevent creeping of the auxiliary rim, said single projection being provided with an aperture arranged to aline with the aperture in the main rim for the accommodation of the valve stem.

2. A wheel provided with a main rim having an aperture, an auxiliary rim circumferentially spaced therefrom, means for detachably securing the auxiliary rim in position on the main rim, projections on said main rim in the circumferential space between said rims located on either side of said aperture, a single projection on said auxiliary rim also in said circumferential space arranged to enter the space between said two projections to prevent creeping of the auxiliary rim, said projection on the auxiliary rim being provided with an aperture adapted to aline with the aperture in the main rim for the accommodation of the valve stem.

In testimony whereof I have signed my name to this specification in the presence of two subscribing witnesses.

WILLY TISCHBEIN.

Witnesses:
JOHN LOTKA,
JOHN A. KEHLENBECK.